UNITED STATES PATENT OFFICE.

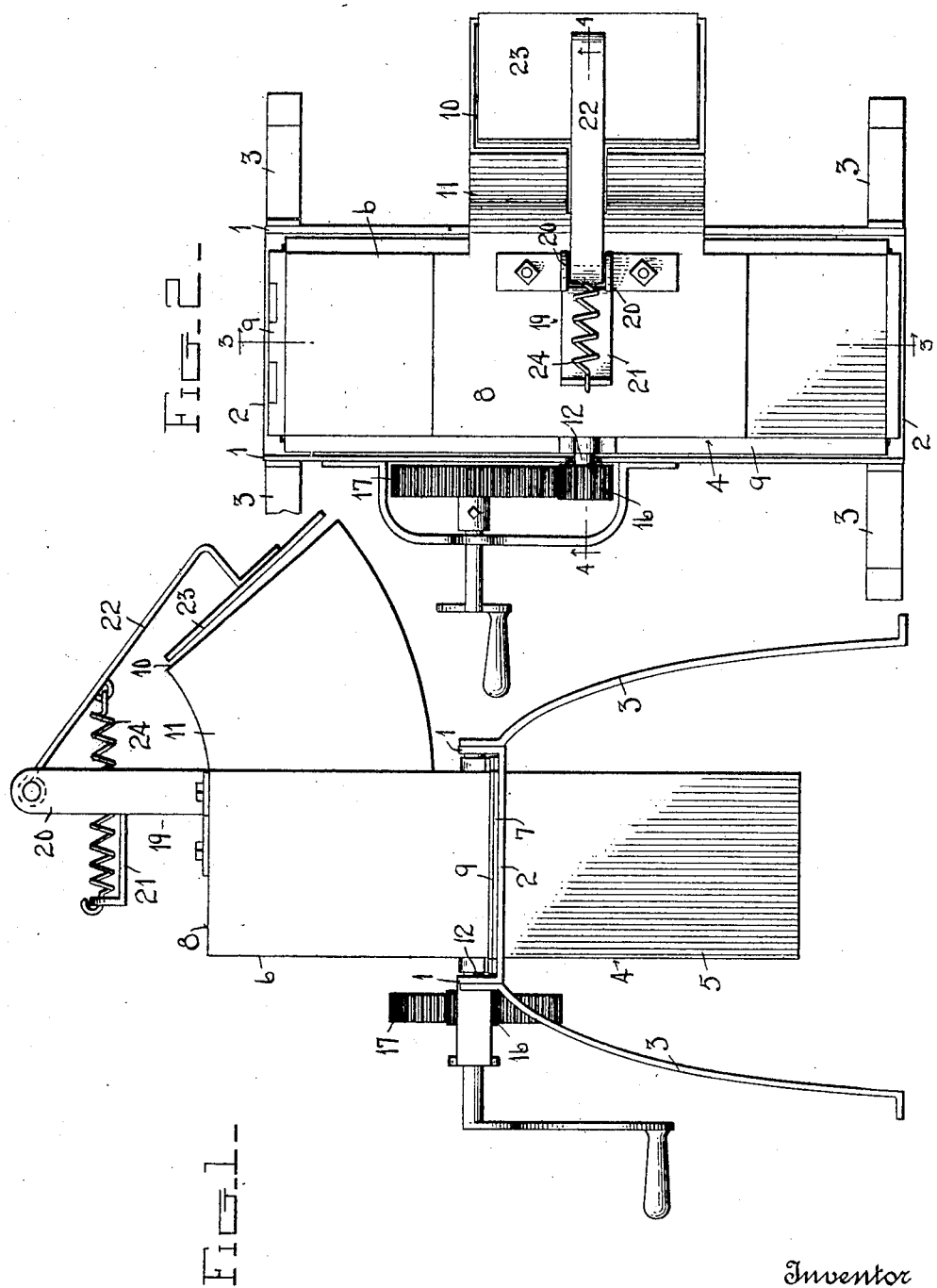

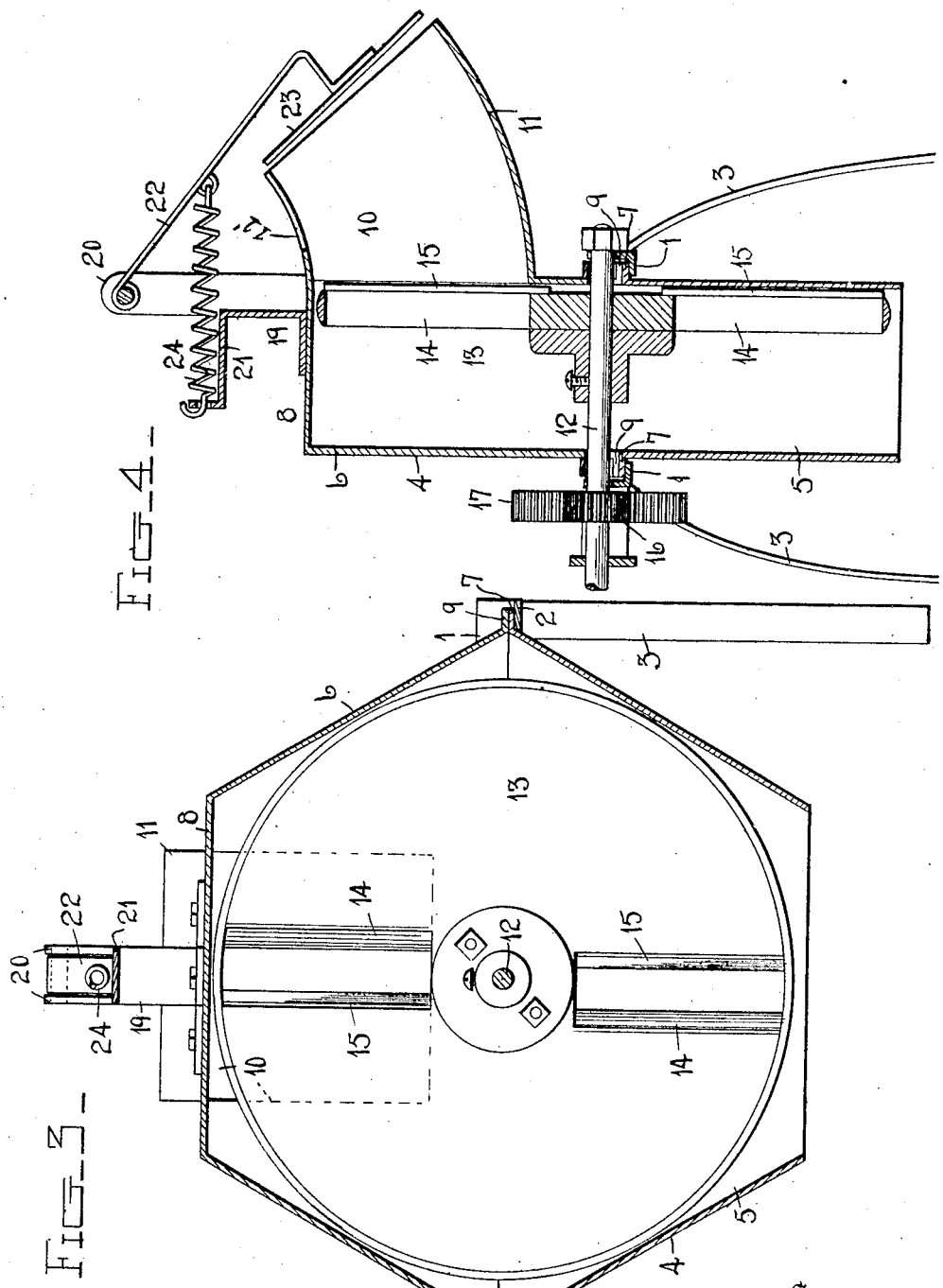

JOHN J. VAVRUSKA, OF CLEVELAND, OHIO.

VEGETABLE-SLICING MACHINE.

No. 878,436.      Specification of Letters Patent.      Patented Feb. 4, 1908.

Application filed June 10, 1907. Serial No. 378,241.

*To all whom it may concern:*

Be it known that I, JOHN J. VAVRUSKA, a citizen of the United States, residing at Cleveland, in the county of Cuyahoga and State of Ohio, have invented certain new and useful Improvements in Vegetable-Slicing Machines; and I do declare the following to be a full, clear, and exact description of the invention, such as will enable others skilled in the art to which it appertains to make and use the same.

My invention has relation to new and useful improvements in vegetable slicing machines and has for its object to provide a simple and economical device of this character by means of which vegetables such as potatoes, apples, cabbage or the like may be sliced in an expeditious manner with a minimum of labor and without danger to the operator.

With the foregoing and other objects in view which will appear as the nature of the invention is better understood, the invention consists in certain novel features of construction, combination and arrangement of parts, as will be hereinafter fully described and claimed.

In the accompanying drawings, Figure 1 is an end elevation of a vegetable slicer constructed in accordance with the invention, the follower being raised out of the feed mouth or spout; Fig. 2 is a top plan view of the vegetable slicing machine; Fig. 3 is a longitudinal sectional view on the line 3—3 of Fig. 2 looking in the direction of the arrows; and Fig. 4 is a cross-sectional view on the line 4—4 of Fig. 2 looking in the direction of the arrows.

As shown in the drawings, the supporting frame comprises side and end pieces 1 and 2 respectively. Supporting legs 3 of any suitable form are provided for said frame.

The numeral 4 represents a flat casing of preferably hexagonal form comprising a lower inverted semi-hexagonal section 5 and an upper semi-hexagonal section 6. The lower section is open at its bottom or lower end and is bent or turned outwardly at its upper side and end edges to provide outwardly extending supporting flanges 7 adapted to engage the side and end pieces of the supporting frame and support the lower section in position below the frame. The upper section is closed in at its top or upper end by a wall 8 and is provided at its lower side and end edges with outwardly-extending flanges 9 to correspond with the outwardly-extending flanges of said lower section. Said upper section is hingedly connected at one of its bottom ends to said lower section so that it may be swung open to gain access to the interior of the casing. The front side of said upper section is also provided with a suitable feed opening 10 and a feed mouth or spout 11 extends outwardly from said side and surrounds said feed opening. An axle 12 is journaled to said supporting frame transversely of the machine and has adjustably fixed near its front end a cutting disk 13 having elongated diametrically opposite slots or openings 14 extending from its periphery to points near its center and two cutting knives 15 preferably of substantially rectangular form are bolted or otherwise removably secured to the front face of said cutting disk and extending a suitable distance over the slots or openings therein. A pinion 16 is rigidly fixed to the rear end of said axle 12 and is adapted to mesh with a drive gear 17 fixed to a shaft, journaled near the rear side of the machine in any suitable manner and provided with a suitable crank for turning it, as shown.

A standard 19 comprising two vertical oppositely-disposed arms 20 and an angular arm 21 extending from the rear side edges and near the lower ends of said vertical arms is removably mounted on the top of said upper section 6. A follower bar 22 is pivotally connected at one end between and near the upper end of the vertical arms of said standard and secured in any suitable manner to its opposite or free end is a follower 23 adapted to work in the mouth piece or spout 11 of said upper section 6. A a slot 11' in the upper part of the spout 11 receives the follower bar 22, and allows the follower 23 to closely approach the slicing disk. A resilient element preferably in the form of a coiled spring 24 is removably secured at one end near the pivoted end of said follower bar and is removably secured at its opposite end to the free end of said angular arm 21 of the standard and serves to normally maintain a pull on said follower bar to cause it to press the potatoes or other vegetables in the mouth or feed spout in engagement with the cutting disk. In filling the feed mouth or spout with potatoes or other vegetables to be sliced the rear end of said coiled spring may be removed from the free end of the angular arm 21 of the standard to obviate all liability of the spring becoming strained in raising the follower. After the mouth or feed spout has been filled with potatoes or other vegetables the end of the coiled spring is again secured in position.

From the foregoing description taken in connection with the accompanying drawings, the construction and operation of the invention will be readily understood without requiring a more extended explanation.

Having thus described my invention, what I claim as new is:—

1. A vegetable slicing machine, a casing having a feed opening in one side, and a feed spout surrounding said opening, a standard mounted on said casing, a follower bar pivoted to said standard, a follower secured to the free end of said follower bar and working in said feed spout, a slot in said feed spout adapted to receive said follower bar, a cutting disk journaled in said casing, and a coiled spring connected to said standard and an intermediate point of said follower to yieldably press said follower toward said cutting disk.

2. In a vegetable slicing machine, a frame consisting of horizontally lying side and end strips having suitable supports, a casing consisting of a lower section having near its top an outwardly extending flange adapted to lie on said strips to support said section, an upper section having an outwardly extending flange at its lower edge, adapted to lie on the flange of said lower section, hinges connecting said flanges, a shaft mounted for rotation on said side strips on each side of said casing and extending through said casing at the meeting line of said flanges, a cutting disk rigidly secured to said shaft for rotation therewith, an opening in the vertical side of said upper casing, a spout extending laterally and upwardly from said side, a slot extending longitudinally in the upper side of said spout, a follower bar pivoted above said spout and adapted to move in said slot, a follower rigidly secured to said bar and a spring fastened at one end to parts supported by said upper casing at the other end to said follower bar at a point between its pivoted end and the part thereof received by said slot.

In testimony whereof I have hereunto set my hand in presence of two subscribing witnesses.

JOHN J. VAVRUSKA.

Witnesses:
FRANK T. MANAK,
JOS. W. BASTUNEK.